United States Patent
Shukla et al.

(10) Patent No.: US 10,057,164 B2
(45) Date of Patent: Aug. 21, 2018

(54) APPARATUS AND METHODS TO AGGREGATE FCOE (FIBRE CHANNEL OVER ETHERNET) FILTER RULES OF A SINGLE INTERFACE IN A SINGLE OR FEW RULES ON A FIRST-HOP FCOE NETWORKING ELEMENT

(71) Applicant: Juniper Networks, Inc., Sunnyvale, CA (US)

(72) Inventors: Amit Shukla, Sunnyvale, CA (US); Ronak Shah, Sunnyvale, CA (US)

(73) Assignee: Juniper Networks, Inc., Sunnyvale, CA (US)

( * ) Notice: Subject to any disclaimer, the term of this patent is extended or adjusted under 35 U.S.C. 154(b) by 0 days.

(21) Appl. No.: 15/457,559

(22) Filed: Mar. 13, 2017

(65) Prior Publication Data

US 2017/0187619 A1   Jun. 29, 2017

Related U.S. Application Data

(63) Continuation of application No. 12/976,200, filed on Dec. 22, 2010, now abandoned.

(51) Int. Cl.
*H04L 12/741* (2013.01)
*H04L 29/12* (2006.01)

(52) U.S. Cl.
CPC .............. *H04L 45/74* (2013.01); *H04L 61/10* (2013.01); *H04L 61/6004* (2013.01); *H04L 61/6022* (2013.01); *H04L 61/6045* (2013.01)

(58) Field of Classification Search
CPC ..... H04L 45/74; H04L 61/10; H04L 61/6004; H04L 61/6022; H04L 61/6045
See application file for complete search history.

(56) References Cited

U.S. PATENT DOCUMENTS

| | | | |
|---|---|---|---|
| 4,550,402 A | 10/1985 | Gable et al. | |
| 6,041,058 A | 3/2000 | Flanders et al. | |
| 7,719,969 B1 | 5/2010 | Dropps et al. | |
| 8,321,908 B2 | 11/2012 | Gai et al. | |
| 8,351,448 B1 * | 1/2013 | McGlaughlin | H04L 49/356 370/252 |
| 8,705,351 B1 * | 4/2014 | McGlaughlin | H04L 67/1097 370/220 |
| 8,706,905 B1 * | 4/2014 | McGlaughlin | H04L 45/742 709/238 |
| 2003/0225964 A1 | 12/2003 | Krishnan et al. | |
| 2006/0036847 A1 | 2/2006 | Bush et al. | |
| 2009/0037977 A1 | 2/2009 | Gai et al. | |

(Continued)

*Primary Examiner* — Peter Chau
(74) *Attorney, Agent, or Firm* — Cooley LLP

(57) ABSTRACT

In one embodiment, an apparatus can include a filter module configured to receive multiple Media Access Control (MAC) addresses associated with multiple virtual ports instantiated at a first network device. Each virtual port from the multiple virtual ports can be associated with a MAC address from the multiple MAC addresses. The filter module can be configured to define a filter to be applied to a data frame sent between the first network device and a network switch, the filter being based at least in part on a MAC address prefix included in each MAC address from the plurality of MAC addresses. The MAC address prefix can include an identifier uniquely associated with a second network device at which the filter module operates.

13 Claims, 5 Drawing Sheets

(56) References Cited

U.S. PATENT DOCUMENTS

| | | |
|---|---|---|
| 2009/0132701 A1 | 5/2009 | Snively |
| 2009/0296726 A1 | 12/2009 | Snively et al. |
| 2010/0208740 A1 | 8/2010 | Furutani |
| 2010/0232419 A1 | 9/2010 | Rivers |
| 2011/0064086 A1 | 3/2011 | Xiong et al. |
| 2011/0280255 A1 | 11/2011 | DeSanti |
| 2011/0299539 A1 | 12/2011 | Rajagopal et al. |
| 2012/0039163 A1* | 2/2012 | Nakajima ............ H04L 41/0654 370/217 |
| 2012/0155469 A1 | 6/2012 | Majumdar et al. |
| 2013/0086266 A1 | 4/2013 | Gai et al. |

* cited by examiner

APPARATUS AND METHODS TO AGGREGATE FCOE (FIBRE CHANNEL OVER ETHERNET) FILTER RULES OF A SINGLE INTERFACE IN A SINGLE OR FEW RULES ON A FIRST-HOP FCOE NETWORKING ELEMENT

CROSS-REFERENCE TO RELATED APPLICATIONS

This application is a Continuation of and claims priority to, and the benefit of, U.S. application Ser. No. 12/976,200 (now published as U.S. application publication no. 2012/0163395), filed Dec. 22, 2010 and entitled, "APPARATUS AND METHODS TO AGGREGATE FCOE (FIBRE CHANNEL OVER ETHERNET) FILTER RULES OF A SINGLE INTERFACE IN A SINGLE OR FEW RULES ON A FIRST-HOP FCOE NETWORKING ELEMENT." The entire contents of the aforementioned application are herein incorporated by reference in their entireties.

BACKGROUND

Some embodiments described herein relate generally to network switching, and more particularly to switching policies and filters for improved Fibre Channel over Ethernet (FCoE) network switching.

Many modern computer networks include hardware devices and/or software (executing in hardware) configured to transfer data frames according to one or both of the Ethernet and Fibre Channel networking standards. To allow for interoperability between Ethernet and Fibre Channel resources, these networks often employ a third network protocol known as Fibre Channel over Ethernet ("FCoE"). By encapsulating Fibre Channel frames within a special Ethernet header, a network device such as an FCoE gateway can send Fibre Channel frames from one Fibre Channel device to another over an Ethernet network.

Typical FCoE-to-Fibre Channel gateways ("FCoE gateways") thus are typically capable of: (1) relaying, to a Fibre Channel device (such as a switch), a Fibre Channel frame extracted from within an FCoE frame and (2) encapsulating a received Fibre Channel frame within an FCoE frame that can be forwarded, via an Ethernet network, to another Fibre Channel device (such as a peripheral processing device). As part of its switching responsibilities, many FCoE gateways adhere to one or more switching policies, rules or filters that dictate specific switching behavior. Many such filters dictate, for example, whether an FCoE gateway should deliver, drop, or re-direct a received frame based on the frame's type, format, and/or contents.

While such filters allow for more intelligent switching, storage space for these filters is often limited due to scale and cost constraints. More particularly, when an FCoE gateway assigns a distinct Media Access Control ("MAC") address to each virtual Fibre Channel port instantiated at a peripheral Fibre Channel device, the presence of a filter rule for each MAC address/virtual port pair can result in inefficient use of filter storage space. Thus, a need exists for methods and apparatus to minimize the amount of storage space (i.e., memory) used to store such filters associated with the switching of FCoE frames to Fibre Channel devices.

Additionally, because devices executing on the periphery of a switch fabric system are often untrusted, a need can further exist for methods and apparatus to define one or more filters and/or switching policies to: 1) check whether data frames and/or packets received from a peripheral processing device include appropriate header and/or address information and 2) minimize the transmission of data frames including "spoofed" sender identity information.

SUMMARY

In one embodiment, an apparatus can include a filter module configured to receive multiple Media Access Control (MAC) addresses associated with multiple virtual ports instantiated at a first network device. Each virtual port from the multiple virtual ports can be associated with a MAC address from the multiple MAC addresses. The filter module can be configured to define a filter to be applied to a data frame sent between the first network device and a network switch, the filter being based at least in part on a MAC address prefix included in each MAC address from the multiple MAC addresses. The MAC address prefix can include an identifier uniquely associated with a second network device at which the filter module operates.

DETAILED DESCRIPTION

Figure 1:
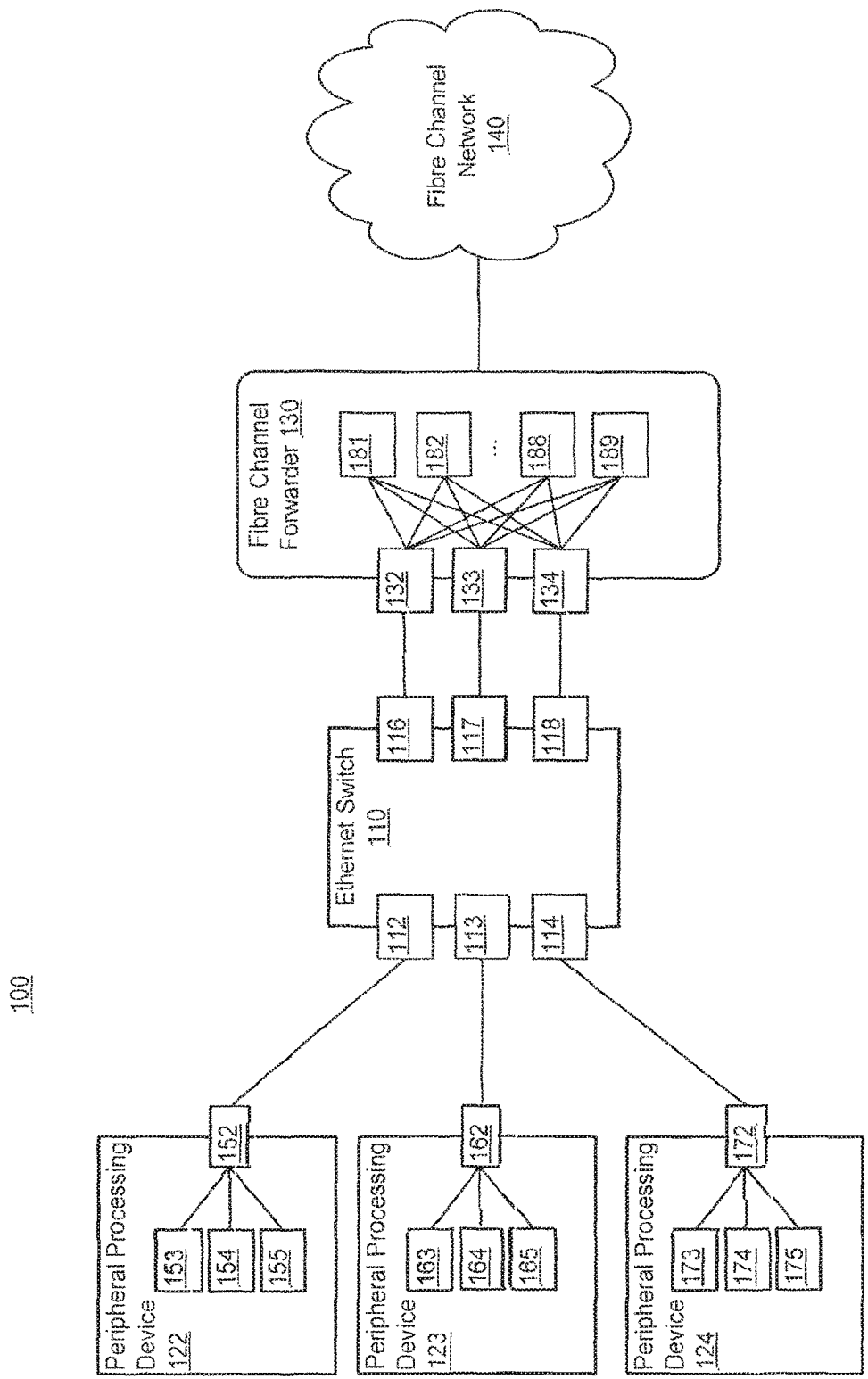
FIG. 1 is a schematic illustration of a mixed Ethernet and Fibre Channel portion of a network, according to an embodiment.

In some embodiments, a first-hop device (such as an FCoE-to-Fibre Channel gateway ("FCoE gateway")) can be coupled to one or more peripheral processing devices. The first-hop device can be any device directly and/or operatively coupled to a peripheral processing device (i.e., the first device encountered by any data frame or packet sent by the peripheral processing device on its path to destination). The first-hop device can also be coupled to a Fibre Channel switch (such as a Fibre Channel forwarder) via one or more devices including one or more FCoE and/or Fibre Channel ports. The Fibre Channel switch can include one or more virtual Fibre Channel F ports, and can be further operatively and/or physically coupled to a Fibre Channel network. Each of the peripheral processing devices can be physically and/or operatively coupled to the first-hop device via one or more FCoE ports and, optionally, an Ethernet network. Any or all of the peripheral processing devices can include one or more virtual Fibre Channel N ports, each virtual Fibre Channel N port being uniquely and operatively coupled to a distinct virtual Fibre Channel F port instantiated at the Fibre Channel switch.

The first-hop device can receive a Fibre Channel over Ethernet Initialization Protocol (FIP) request based on a Fibre Channel fabric login request sent from one of the virtual Fibre Channel N ports instantiated at one of the peripheral processing devices. The FIP request can include, for example, an FIP Fabric Login (FLOGI) or Fabric Discovery (FDISC) request that requests a Fibre Channel ID (FCID) and/or MAC address for the requesting virtual Fibre Channel N port. The first-hop device can then forward the FIP request, or alternatively define a Fibre Channel fabric login request based on the FIP request, the Fibre Channel fabric login request being included in a signal sent to the Fibre Channel switch for handling. In some embodiments, the Fibre Channel switch can next assign an FCID to the requesting virtual Fibre Channel N port. The FCID can be based on an 8-bit domain ID associated with the Fibre Channel switch, an 8-bit area ID associated with a set of virtual Fibre Channel N ports of the requesting peripheral processing device and an 8-bit port ID for the requesting virtual Fibre Channel N port of the peripheral processing device. Having defined the assigned FCID for the requesting virtual Fibre Channel N Port, the Fibre Channel switch can send a signal including a Fibre Channel fabric login response that includes the defined FCID to the first-hop device via one of the Fibre Channel ports of the Fibre Channel switch.

In some embodiments, the first-hop device can receive the signal including the assigned FCID and assign a MAC address to the requesting virtual Fibre Channel N port. Alternatively, a second-hop device logically situated between the first-hop device and the Fibre Channel switch can receive the signal and assign the MAC address to the requesting Fibre Channel N port. In such embodiments, the first-hop device can be, e.g., an Ethernet switch or an FCoE switch, and the second-hop device can be an FCoE gateway. (The second-hop device can be any second device encountered by a data frame or packet sent by the peripheral processing device on its path to destination.) The assigned MAC address can include a first 24-bit portion based on an organizationally unique identifier (OUI) associated with the Fibre Channel switch. Alternatively, the assigned MAC address can include a 24-bit portion based on a gateway ID associated with the first-hop device and/or another device. The assigned MAC address can further include a second 24-bit portion based on the assigned FCID. The first-hop device or the second-hop device can also define a MAC address mask based at least in part on a common MAC address portion common to all MAC addresses assigned and/or to be assigned to any virtual Fibre Channel N port instantiated at the peripheral processing device at which the requesting virtual Fibre Channel N port is instantiated (i.e., the peripheral processing device from which the original FIP request was sent). The MAC address mask can include, for example, the 24-bit OUI or gateway ID associated with the Fibre Channel switch, as well as the common 8-bit domain ID and common 8-bit area ID described above. The MAC address mask can further include an initial port ID portion common to all port IDs assigned and/or to be assigned to any virtual Fibre Channel N port instantiated at the peripheral processing device.

Having defined and assigned the MAC address, MAC address mask and FCID associated with the requesting virtual Fibre Channel N port, the first-hop device or the second-hop device can define a filter (also referred to as a "switching policy"). The filter can be defined based at least in part on the MAC address mask. In some embodiments, the filter can allow and/or direct the first-hop device to send, for eventual delivery to the Fibre Channel switch, a Fibre Channel frame encapsulated in any received FCoE frame including a source MAC address having an initial portion that matches the defined MAC address mask.

Having defined the filter, a switching module included on or at the first-hop device can apply the filter to one or more received FCoE frames. More specifically, upon receipt of an FCoE frame, the first-hop device can next reference the defined filter and determine whether a predetermined portion of the source MAC address included in the FCoE frame matches the MAC address mask associated with the defined filter. If the portion of the source MAC address does match the MAC address mask, the switching module can send the Fibre Channel frame encapsulated in the FCoE frame for delivery to the Fibre Channel switch. Upon receipt of the Fibre Channel frame, the Fibre Channel switch can send the Fibre Channel frame to the virtual Fibre Channel F port specified by a destination ID ("D ID") included in the Fibre Channel frame. If the portion of the source MAC address does not match the MAC address mask associated with the defined filter, the first-hop device can drop and/or reject the received FCoE frame. In this manner, the first-hop device can employ a single filter for switching FCoE frames received from any of a set of multiple virtual Fibre Channel N ports instantiated at a single peripheral processing device.

FIG. 1 is a schematic illustration of a mixed Ethernet and Fibre Channel portion of a network, according to an embodiment. More specifically, FIG. 1 illustrates a Network Portion 100 that includes an Ethernet Switch 110 physically and/or operatively coupled to Peripheral Processing Devices 122-124 (via FCoE Ports 112-114, respectively) and a Fibre Channel Forwarder 130 (via FCoE Ports 116-118). The Fibre Channel Forwarder 130 is operatively and/or physically coupled to the Ethernet Switch 110 via the FCoE Ports 132-134, and to a Fibre Channel Network 140. The Fibre Channel Forwarder 130 includes a set of Virtual Fibre Channel F Ports 181-189, and each of the Virtual Fibre Channel F Ports 181-189 is operatively coupled to at least one of the FCoE Ports 132-134. The Peripheral Processing Devices 122-124 are operatively and/or physically coupled to the Ethernet Switch 110 via the FCoE Ports 152, 162 and 172, respectively. The FCoE Ports 152, 162 and 172 are operatively coupled to the Virtual Fibre Channel N Ports 153-155, 163-165 and 173-175, respectively. Each of the Virtual Fibre Channel N Ports 153-155, 163-165 and 173-175 is uniquely and operatively coupled to one of the Virtual Fibre Channel F Ports 181-189 instantiated at the Fibre Channel Forwarder 130.

The Network Portion 100 can include a combination of hardware and/or software (executing on hardware) configured to transmit data between any of the Peripheral Processing Devices 122-124 and the Fibre Channel Network 140 via the Ethernet Switch 110 and the Fibre Channel Forwarder 130. The Network Portion 100 can be, for example, a portion of a data center fabric, local area network (LAN), wide area network (WAN), storage area network (SAN), intranet, or the Internet. Although not shown in FIG. 1, in some embodiments, the Network Portion 100 can include a second-hop device, such as a FCoE gateway, logically situated between the Ethernet Switch 110 and the Fibre Channel Forwarder 130. In such embodiments, the FCoE gateway can perform one or more of the functions discussed below in connection with the Ethernet Switch 110 and/or the Fibre Channel Forwarder 130. Alternatively, in some embodiments, the Network Portion 100 can not include the Ethernet Switch 110. In such embodiments, the Fibre Channel Forwarder 130 can be configured to perform one or more of the functions discussed below in connection with the Ethernet Switch 110.

The Ethernet Switch 110 can be configured to transmit data based at least in part on the Ethernet and/or FCoE network protocols via the FCoE Ports 112-114 and/or the FCoE Ports 116-118. In some embodiments, the Ethernet Switch 110 can be an FCoE transit switch. In such embodiments, the FCoE Ports 112-114 can be configured to send FCoE frames to and/or receive FCoE frames from any of the FCoE Ports 152, 162 and 172. In such embodiments, the FCoE Ports 116-118 can be configured to send FCoE frames to and/or receive FCoE frames from the Fibre Channel Forwarder 130, via the FCoE Ports 132-134, respectively. In some embodiments, each of the FCoE Ports 112-114 can be a physical Ethernet port configured to exchange data with any of the Peripheral Processing Devices 122-124, respectively, via the FCoE Ports 152, 162 and 172, respectively. Although not shown in FIG. 1, in some embodiments, each of the FCoE Ports 112-114 can be physically coupled to one of multiple Ethernet Network Interface Cards (NICs) included in the Ethernet Switch 110. As shown in FIG. 1, each of the FCoE Ports 116-118 is uniquely coupled to one of the FCoE Ports 132-134 of the Fibre Channel Forwarder 130. In some embodiments, each of the FCoE Ports 116-118 can be a physical Ethernet port configured to allow exchange of one or more FCoE frames between the Ethernet Switch 110 and the Fibre Channel Forwarder 130.

In some embodiments, the Ethernet Switch 110 can receive, from one of the Virtual Fibre Channel N Ports 153-155, 163-165 and 173-175, a Fibre Channel over Ethernet Initialization Protocol (FIP) login request, such as an FIP FLOGI or FIP FDISC request. In such embodiments, the Ethernet Switch 110 can forward the FIP login request to the Fibre Channel Forwarder 130.

In some embodiments, the Ethernet Switch 110 can receive, in an FIP FLOGI or FIP FDISC response defined by the Fibre Channel Forwarder 130, the predetermined FCID prefix associated with the peripheral processing device. (The FIP FLOGI or FIP FDISC response can be defined in accordance with one or more extensions of the FIP protocol configured to allow inclusion of the predetermined FCID prefix and/or other information within an FIP login response.) The FIP FLOGI or FIP FDISC response can also include an FCID assigned to a requesting virtual Fibre Channel N port (e.g., the Virtual Fibre Channel N Port 153) by the Fibre Channel Forwarder 130. The FIP FLOGI or FIP FDISC response can also optionally include an assigned MAC address for the requesting virtual Fibre Channel N port (optionally referred to as a source MAC address). In such embodiments, the Ethernet Switch 110 can perform "FIP snooping" on the received FIP FLOGI or FIP FDISC response to determine a value of the FCID prefix and/or the source MAC address. Based on the FCID prefix and/or the source MAC address, the Ethernet Switch 110 can define a MAC address prefix. In some embodiments, the Ethernet Switch 110 can receive the predetermined FCID prefix and/or the predetermined MAC address prefix from a different device operatively coupled to the Fibre Channel Forwarder 130 (such as an FCoE gateway device). In some embodiments, based on the FIP snooping action, the Ethernet Switch 110 can define and/or install one or more switching policies, as described below.

Although not shown in FIG. 1, the Ethernet Switch 110 can include one or more data structures indicating one or more switching policies, rules and/or filters. For example, in some embodiments, the Ethernet Switch 110 can include and/or be operatively coupled to a switching table and/or filter database (not shown in FIG. 1) for use in switching data frames sent from one or more of the Peripheral Processing Devices 122-124 to the Fibre Channel Forwarder 130. More specifically, the Ethernet Switch 110 can define and/or apply one or more switching policies, such as a switching policy specifying or allowing that the Ethernet Switch 110 should only send to the Fibre Channel Forwarder 130 a Fibre Channel frame extracted (i.e., decapsulated) from within a received FCoE frame that has a source MAC address conforming to a predetermined MAC address prefix. The MAC address prefix can be based on the predetermined FCID prefix associated with the peripheral processing device from which the FCoE frame was received. Accordingly, the Ethernet Switch 110 can serve as a gateway between the Peripheral Processing Devices 122-124 and the Fibre Channel Forwarder 130, allowing for the transmission of FIP login requests and/or FCoE frames from the Peripheral Processing Devices 122-124 to the Fibre Channel Forwarder 130, and for the transmission of FIP login responses and/or Fibre Channel frames (encapsulated in FCoE frames) from the Fibre Channel Forwarder 130 to any of the Virtual Fibre Channel N Ports 153-155, 163-165 and 173-175 instantiated at the Peripheral Processing Devices 122, 123 and 124, respectively.

In some embodiments, the Ethernet Switch 110 can be physically located within the same physical chassis as the Fibre Channel Forwarder 130. In some embodiments the Ethernet Switch 110 can function as both an FCoE gateway and a Fibre Channel switching device. Alternatively, the Ethernet Switch 110 and the Fibre Channel Forwarder 130 can be located within different chasses. In some embodiments, the Ethernet Switch 110 can include one or more devices and or modules physically and/or operatively coupled via cable (such as Category 5 cable) and/or one or more wireless connections. Although not shown in FIG. 1, in some embodiments, the Ethernet Switch 110 can alternatively be a gateway device, such as an FCoE gateway device (as discussed in connection with FIG. 4 below). In such embodiments, the FCoE gateway can perform substantially similar functions to those described in connection with the Ethernet Switch 110 above, and/or additional or other functions.

Each of the Peripheral Processing Devices 122-124 can be any combination of hardware and/or software (executing in hardware) capable of transmitting information to and/or receiving information from the Ethernet Switch 110. In some embodiments, one or more of the above-described peripheral processing devices can be a server device, an application server, a database system, a storage device, gateway, workstation, a compute device and/or the like. Each of the Peripheral Processing Devices 122-124 can optionally be, for example, compute nodes, service nodes and/or storage nodes. In some embodiments, one or more of the Peripheral Processing Devices 122-124 can perform one or more computing tasks, such as one or more data storage, Software-as-a-Service (SAS), web service, content request, or other computing tasks. In some embodiments, one or more of the Peripheral Processing Devices 122-124 can be a Fibre Channel-based device operatively and/or physically coupled to one or more other Fibre Channel-based devices, such as a Fibre Channel switch, a Fibre Channel fabric, a SAN, etc.

As shown in FIG. 1, the Peripheral Processing Devices 122-124 can include the FCoE Ports 152, 162 and 172, respectively, and the Virtual Fibre Channel N Ports 153-155, 163-165 and 173-175, respectively. In some embodiments, each of the Virtual Fibre Channel N Ports 153-155, 163-165 and 173-175 can be configured to send one or more Fibre Channel frames for encapsulation within an FCoE frame and subsequent transmission by the corresponding FCoE port from the FCoE Ports 152, 162 and 172. The appropriate FCoE port from the FCoE Ports 152, 162 and 172 can transmit the FCoE frame to the Ethernet Switch 110. Each of the Virtual Fibre Channel N Ports 153-155, 163-165 and 173-175 can also be configured to receive one or more Fibre Channel frames that have been extracted and/or decapsulated from one or more FCoE frames, each of the FCoE frames having been received by the corresponding FCoE port from the FCoE Ports 152, 162 and 172 via the Ethernet Switch 110. In some embodiments, the Peripheral Processing Devices 122-124 can be in communication with the Ethernet Switch 110 via any suitable connection such as, for example, an optical connection (e.g., an optical cable and optical connectors), an electrical connection (e.g., an electrical cable and electrical connectors) and/or the like. Similarly stated, each of the FCoE Ports 152, 162 and 172 can provide a communication interface through which a Peripheral Processing Device 122-124 can be operatively coupled to the Ethernet Switch 110. As such, the Peripheral Processing Devices 122-124 are configured to send data (e.g., Ethernet frames, FCoE frames, data frames, data cells, etc.) to and receive data from the Ethernet Switch 110. In some embodiments, each connection between the Peripheral Processing Devices 122-124 and the Ethernet Switch 110 is a direct link. In other embodiments, the Peripheral Processing Devices 122-124 can be operatively coupled to the Ethernet Switch 110 via intermediate modules or devices. In some embodiments, any combination of the Peripheral Processing Devices 122-124 can be physically located within the same physical chassis as one another and/or any other device included in the Ethernet Switch 110. In other embodiments, each of the Peripheral Processing Devices 122-124 can be located within a different chassis.

The FCoE ports 152, 162 and 172 can be physical Ethernet ports capable of sending and/or receiving one or more Ethernet and/or FCoE frames. In some embodiments, each of the FCoE ports 152, 162 and 172 can be associated with and/or located on a physical line card (not shown in FIG. 1), such as an Ethernet NIC. In some embodiments, each of the FCoE ports 152, 162 and 172 can include and/or be associated with a frame-formatter module (not shown in FIG. 1) included in each of the Peripheral Processing Devices 122-124, respectively. The frame-formatter modules can each be configured to encapsulate Fibre Channel frames received from a virtual Fibre Channel N port within FCoE frames for transmission to the Fibre Channel Forwarder 130 via the Ethernet Switch 110. In such embodiments, each such frame-formatter module can be further configured to decapsulate and/or extract Fibre Channel frames from within FCoE frames received via the Ethernet Switch 110.

The Virtual Fibre Channel N Ports 153-155, 163-165 and 173-175 can be virtual Fibre Channel N ports similar to those generally associated with Fibre Channel and/or FCoE networks. In some embodiments, one or more of the Virtual Fibre Channel N Ports 153-155, 163-165 and 173-175 can constitute one of two virtual end nodes that define a virtual link. In such embodiments, each such Virtual Fibre Channel N Port can each be operatively coupled to a Virtual Fibre Channel F Port from the Virtual Fibre Channel F Ports 181-189 instantiated at the Fibre Channel Forwarder 130.

The Fibre Channel Forwarder 130 can be any combination of hardware and/or software (executing in hardware) configured to perform switching of Fibre Channel frames extracted from FCoE frames received from the Ethernet Switch 110 and/or Fibre Channel frames received from the Fibre Channel Network 140. As shown in FIG. 1, the Fibre Channel Forwarder 130 is physically and/or logically situated between the Ethernet Switch 110 and the Fibre Channel Network 140, and can be configured to perform known switching tasks on Fibre Channel frames transmitted between the Ethernet Switch 110 and the Fibre Channel Network 140. As also shown in FIG. 1, the Fibre Channel Forwarder 130 includes FCoE Ports 132-134, each of which is operatively and/or physically coupled to one of the FCoE Ports 116-118 on the Ethernet Switch 110. In some embodiments, each of the FCoE Ports 132-134 can be an FCoE port configured to exchange one or more FCoE frames with a single FCoE port from the FCoE Ports 116-118. The Fibre Channel Forwarder 130 also includes the Virtual Fibre Channel F Ports 181-189. In some embodiments, each of the Virtual Fibre Channel F Ports 181-189 can be operatively coupled to one of the Virtual Fibre Channel N Ports 153-155, 163-165 and 173-175 instantiated at the Peripheral Processing Devices 122, 123 and 124, respectively. In such embodiments, each of the Virtual Fibre Channel F Ports 181-189 can exchange Fibre Channel frames with a single virtual Fibre Channel N port from the Virtual Fibre Channel N Ports 153-155, 163-165 and 173-175, thus defining a virtual link between those two virtual Fibre Channel ports.

In some embodiments, the Fibre Channel Forwarder 130 can receive an FIP FLOGI request sent from one of the Peripheral Processing Devices 122-124 via the Ethernet Switch 110. The FIP FLOGI request can include a request for an FCID and/or a MAC address to be assigned to a requesting virtual Fibre Channel N port instantiated at the peripheral processing device from the Peripheral Processing Devices 122-124. In response to the FIP FLOGI request, the Fibre Channel Forwarder 130 can define an FCID for the requesting virtual Fibre Channel N port. In such embodiments, the Fibre Channel Forwarder 130 can also define a common FCID prefix to be included in each FCID assigned to a virtual Fibre Channel N port instantiated at the peripheral processing device at which the requesting virtual Fibre Channel N port is instantiated. The common FCID prefix can be defined such that each FCID assigned to a virtual Fibre Channel N port at the peripheral processing device includes the common FCID prefix, along with a suffix portion unique to that FCID. The common FCID prefix can be a string of bits of sufficient length to distinguish from all FCIDs associated with all other virtual Fibre Channel N ports instantiated at all other peripheral processing devices in the Network Portion 100, but sufficiently short to allow a unique suffix to be included in each FCID assigned to one of the virtual Fibre Channel N ports instantiated at the peripheral processing device. In some embodiments, a given peripheral processing device can be associated with multiple common FCID prefixes, as necessary to provision a unique FCID to each virtual Fibre Channel N port instantiated at that peripheral processing device.

In some embodiments, the Fibre Channel Forwarder 130 can also define a MAC address for the requesting virtual Fibre Channel N port (optionally referred to as a source MAC address). The MAC address can be based on (1) a Fibre Channel mapping prefix (such as an OUI associated with the Fibre Channel Forwarder 130), and (2) the assigned FCID. Having defined the MAC address based on the Fibre Channel mapping and the assigned FCID, the Fibre Channel Forwarder can also define a common MAC address prefix based at least in part on the Fibre Channel mapping and the FCID prefix. The defined MAC address prefix can thus be common to each MAC address assigned to a virtual Fibre Channel N port at the peripheral processing device, and sufficient to determine whether a given assigned MAC address is associated with a virtual Fibre Channel N port instantiated at the peripheral processing device.

Having defined the FCID, FCID prefix, MAC address and common MAC address prefix, the Fibre Channel Forwarder 130 can send a signal to the Ethernet Switch 110. The signal can include, for example, an FIP FLOGI response that includes: (1) the assigned FCID for the requesting virtual Fibre Channel N port (the assigned FCID including the common FCID prefix, (2) the assigned MAC address for the requesting virtual Fibre Channel N port and (3) the common MAC address prefix. The Virtual Fibre Channel F Ports 181-189 can be virtual Fibre Channel F ports similar to those generally associated with Fibre Channel and/or FCoE networks. In some embodiments, one or more of the Virtual Fibre Channel F Ports 181-189 can constitute one of two virtual end nodes that define a virtual link. For example, as described above, each such Virtual Fibre Channel F Port can be uniquely associated with a Virtual Fibre Channel N Port from the Virtual Fibre Channel N Ports 153-155, 163-165 and 173-175, thus defining a virtual link.

In some embodiments, the Fibre Channel Forwarder 130 can comprise multiple physical devices. In some embodiments, the Fibre Channel Forwarder 130 can be or include a Fibre Channel Switch Fabric, such as a multi-stage Fibre Channel fabric. In such embodiments, the Fibre Channel Forwarder 130 can be included in, for example, a data center, and can be define one or more logical hierarchical elements, such as virtual data center fabrics (VDCFs) and/or virtual local area networks (VLANs).

The Fibre Channel Network 140 can be any combination of hardware devices and/or software modules (executing in hardware) that together comprise a Fibre Channel network. For example, although not shown in FIG. 1, the Fibre Channel Network 140 can include one or more Fibre Channel-compatible servers and/or peripheral devices connected to one or more Fibre Channel switching devices including one or more Host Bus Adapters (HBAs). In some embodiments, the Fibre Channel Network 140 can include one or more subnetwork portions, such as one or more Fibre Channel zones and/or storage area networks (SANs). As shown in FIG. 1, the Fibre Channel Network 140 can be operatively coupled to the Peripheral Processing Devices 122-124 via the Ethernet Switch 110 and the Fibre Channel Forwarder 130. In such embodiments, the Fibre Channel Network 140 can thus exchange data with the Peripheral Processing Devices 122-124.

Although not shown in FIG. 1, in some embodiments the Network Portion 100 can include a gateway device. In such embodiments, the gateway device can be logically and/or physically positioned between the Ethernet Switch 110 and the Fibre Channel Forwarded 130. The gateway device can be configured to transmit data between the Ethernet Switch 110 and the Fibre Channel Forwarder 130, based at least in part on the Ethernet, FCoE and/or Fibre Channel network protocols. In such embodiments, the gateway device can be configured to send and/or receive one or more FCoE frames to and/or from the Ethernet Switch 110, and to send and/or receive one or more Fibre Channel frames to and/or from the Fibre Channel Forwarder 130. In such embodiments, the gateway device can include a Frame Formatter Module configured to: (1) encapsulate Fibre Channel frames within FCoE frames for transmission to one of the Peripheral Processing Devices 122-124 via the Ethernet Switch 110 and/or (2) extract (i.e., decapsulate) one or more Fibre Channel frames from FCoE frames received from the Ethernet Switch 110 for transmission to the Fibre Channel Forwarder 130. In some embodiments, the gateway device can perform the tasks of defining a MAC address prefix and assigning a MAC address to a requesting virtual Fibre Channel N port as described above in connection with the Fibre Channel Forwarder 130. In such embodiments, the Network Portion 100 can optionally not include the Ethernet Switch 110, and all functions thereof described above can be performed by, for example, the gateway device.

Figure 2:
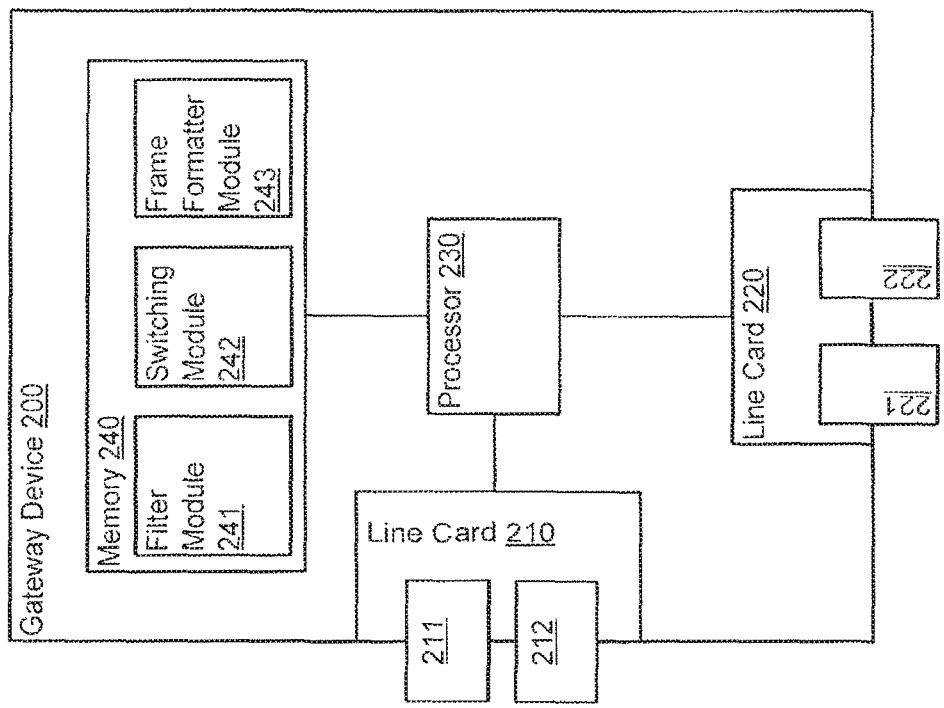
FIG. 2 is a schematic illustration of a gateway device of a mixed Fibre Channel/Ethernet network portion, according to another embodiment.

FIG. 2 is a schematic illustration of a gateway device of a mixed Fibre Channel/Ethernet network portion, according to another embodiment. More specifically, FIG. 2 is a system block diagram of a Gateway Device 200, similar to the gateway device described in connection with FIG. 1 above. The Gateway Device 200 includes a Processor 230, a Memory 240, a Line Card 210 and a Line Card 220. The Memory 240 includes a Filter Module 241, a Switching Module 242 and a Frame Formatter Module 243. The Line Card 210 includes the Physical Ports 211 and 212, and the Line Card 220 includes the Physical Ports 221 and 222. The Processor 230 is operatively coupled to the Memory 240, the Line Card 210 and the Line Card 220. In some embodiments, the Line Cards 210 and/or 220 include one or more processors and/or memories (not shown in FIG. 2).

Similar to the FCoE Ports 112-114 of the Ethernet Switch 110 (shown in FIG. 1), the Physical Ports 211-212 and 221-222 can be configured to communicate with Ethernet and/or peripheral processing devices via an Ethernet Network. Additionally or alternatively, similar to the Fibre Channel Ports 116-118 (shown in FIG. 1), the Physical Ports 211-22 and 221-22 can be configured to communicate with Fibre Channel devices, such as Fibre Channel switches. For example, the Physical Ports 211-212 and 221-222 can implement a physical layer using twisted-pair electrical signaling via electrical cables or fiber-optic signaling via fiber-optic cables. In some embodiments, some of the Physical Ports 211-212 and 221-222 can implement one physical layer such as twisted-pair electrical signaling, and others of the Physical Ports 211-212 and 221-222 can implement a different physical layer, such as fiber-optic signaling. Furthermore, the Physical Ports 211-212 and 221-222 can be configured to allow the Gateway Device 200 to communicate with peripheral processing devices and/or switching devices via a common protocol such as Ethernet, Fibre Channel and/or FCoE. In some embodiments, some of the Physical Ports 211-212 and 221-222 can implement one protocol such as Ethernet/FCoE and others of the Physical Ports 211-212 and 221-222 can implement a different protocol such as Fibre Channel. Thus, the Gateway Device 200 can be in communication with multiple peripheral processing and/or switching devices using homogeneous or heterogeneous physical layers and/or protocols via the Physical Ports 211-212 and 221-222.

In some embodiments, the Gateway Device 200 can be configured to prepare a data frame or packet (e.g., an Ethernet or FCoE frame and/or packet) for transmission to a peripheral processing device (e.g., one of the Peripheral Processing Devices 122-124) or a Fibre Channel device (e.g., the Fibre Channel Forwarder 130). For example, the Frame Formatter Module 243 can be configured to forward, classify, and/or modify the frame encapsulation (e.g., modify, add and/or remove a header portion, footer portion and/or any other identifier included within the data frame) of a data frame prior to sending the data frame to a communication network. Additionally, the Frame Formatter Module 243 can be configured to partition and/or divide the data frame into data cells (e.g., having fixed length payloads) prior to sending the data cells to the switch fabric. Additional details related to frame and/or packet classification are described in U.S. patent application Ser. No. 12/242,168 entitled "Methods and Apparatus Related to Packet Classification Associated with a Multi-Stage Switch," filed Sep. 30, 2008, and U.S. patent application Ser. No. 12/242,172, entitled "Methods and Apparatus for Packet Classification Based on Policy Vectors," filed Sep. 30, 2008, both of which are incorporated herein by reference in their entireties.

In some embodiments, the Gateway Device 200 can be configured to define one or more filters, switching policies and/or rules that dictate how and to where data frames and/or packets are transmitted by the Gateway Device 200. For example, the Filter Module 241 stored at the Memory 240 can be configured to define a filter specifying that all data frames received from a particular logical or physical address should in turn be sent to a device or module having a specified logical or physical address. Alternatively, the Filter Module 241 can define a filter specifying that all data frames of a particular type (such as FCoE, Ethernet, or Fibre Channel) should be sent via one of a specified set of ports (such as one of the FCoE Ports 116-118 shown in FIG. 1). In some embodiments, the Gateway Device 200 can be configured to switch data frames and/or packets according to one or more filters. For example, the Switching Module 242 stored at the Memory 240 can send or forward an FCoE frame to a specified peripheral processing device based at least in part on a filter defined by the Filter Module 242. In some embodiments, the Gateway Device 200 can be configured to define one or more MAC addresses associated with one or more virtual Fibre Channel N ports instantiated at one or more peripheral processing devices operatively coupled to the Gateway Device 200. More specifically, the Gateway Device 200 can define each MAC address based at least in part on a common prefix, such as an Organizationally Unique Identifier (OUI) associated with a switch fabric system (such as the Network Portion 100 shown in FIG. 1) and a Fibre Channel Identifier (FCID) associated with the virtual Fibre Channel port with which the MAC address is to be associated. In some embodiments, the Gateway Device 200 can receive the FCID from a Fibre Channel device (e.g. the Fibre Channel Forwarder 130 illustrated in FIG. 1). In some embodiments, the OUI can alternatively be a common 24-bit prefix associated with the Gateway Device 200, such as a gateway ID.

Although discussed above as being a gateway device, the Gateway Device 200 can alternatively be an Ethernet switch, such as the Ethernet Switch 110 discussed in connection with FIG. 1 above. In such embodiments, the Ethernet switch can include substantially the same hardware and/or software modules/components as described above in connection with the Gateway Device 200. In such embodiments, the Ethernet switch can also perform substantially the same functions as described above in connection with the Gateway Device 200.

Figure 3:
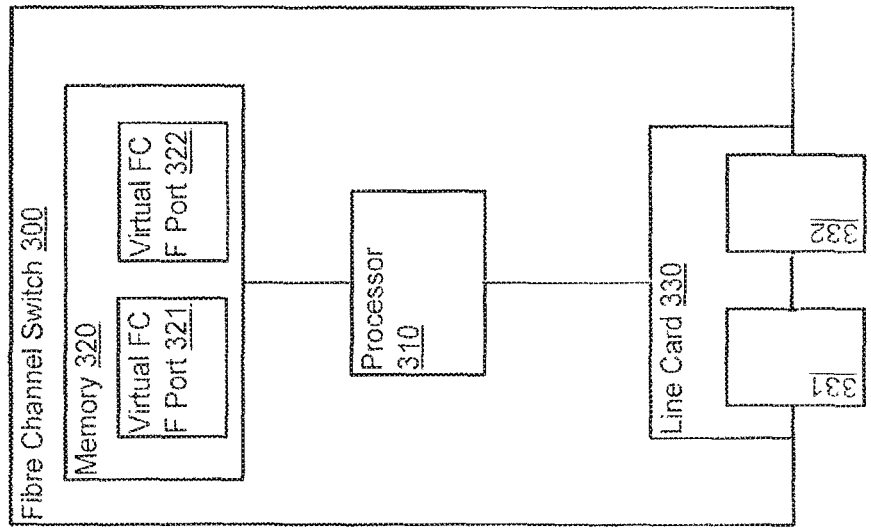
FIG. 3 is a schematic illustration of a Fibre Channel switch of a mixed Fibre Channel/Ethernet network portion, according to another embodiment.

FIG. 3 is a schematic illustration of a Fibre Channel switch, according to another embodiment. More specifically, FIG. 3 is a system block diagram of a Fibre Channel Switch 300 substantially similar to the Fibre Channel Forwarder 130 described in connection with FIG. 1 above, according to an embodiment. The Fibre Channel Switch 300 includes a Processor 310, a Memory 320, and a Line Card 330. The Line Card 330 includes Fibre Channel Ports 331 and 332. The Processor 310 is operatively coupled to the Memory 320 and the Line Card 330. The Memory 320 includes Virtual Fibre Channel F Port 321 and Virtual Fibre Channel F Port 322. The Fibre Channel Switch 300 can communicate with other Fibre Channel devices, such as an FCoE gateway (similar to the Gateway Device 110 shown in FIG. 1), via the Fibre Channel Ports 331 and 332.

In some embodiments, the Fibre Channel Switch 300 can perform typical network switching functions on Fibre Channel frames. The Fibre Channel Switch 300 can, for example, receive a Fibre Channel frame from a gateway device and send that Fibre Channel frame to an appropriate next-hop device within a Fibre Channel network to which the Fibre Channel Switch 300 is coupled. In some embodiments, the Fibre Channel Switch 300 can communicate with one or more peripheral processing devices (e.g., one of the Peripheral Processing Devices 322-324) via the Virtual Fibre Channel F Port 321 and/or the Virtual Fibre Channel F Port 322. For example, the Fibre Channel Switch 300 can send a Fibre Channel frame from the Virtual Fibre Channel F Port 321 for ultimate transmission to a virtual Fibre Channel N port instantiated at a peripheral processing device (e.g., the Virtual Fibre Channel N Port 173 instantiated at the Peripheral Processing Device 124 in FIG. 1).

Figure 4:
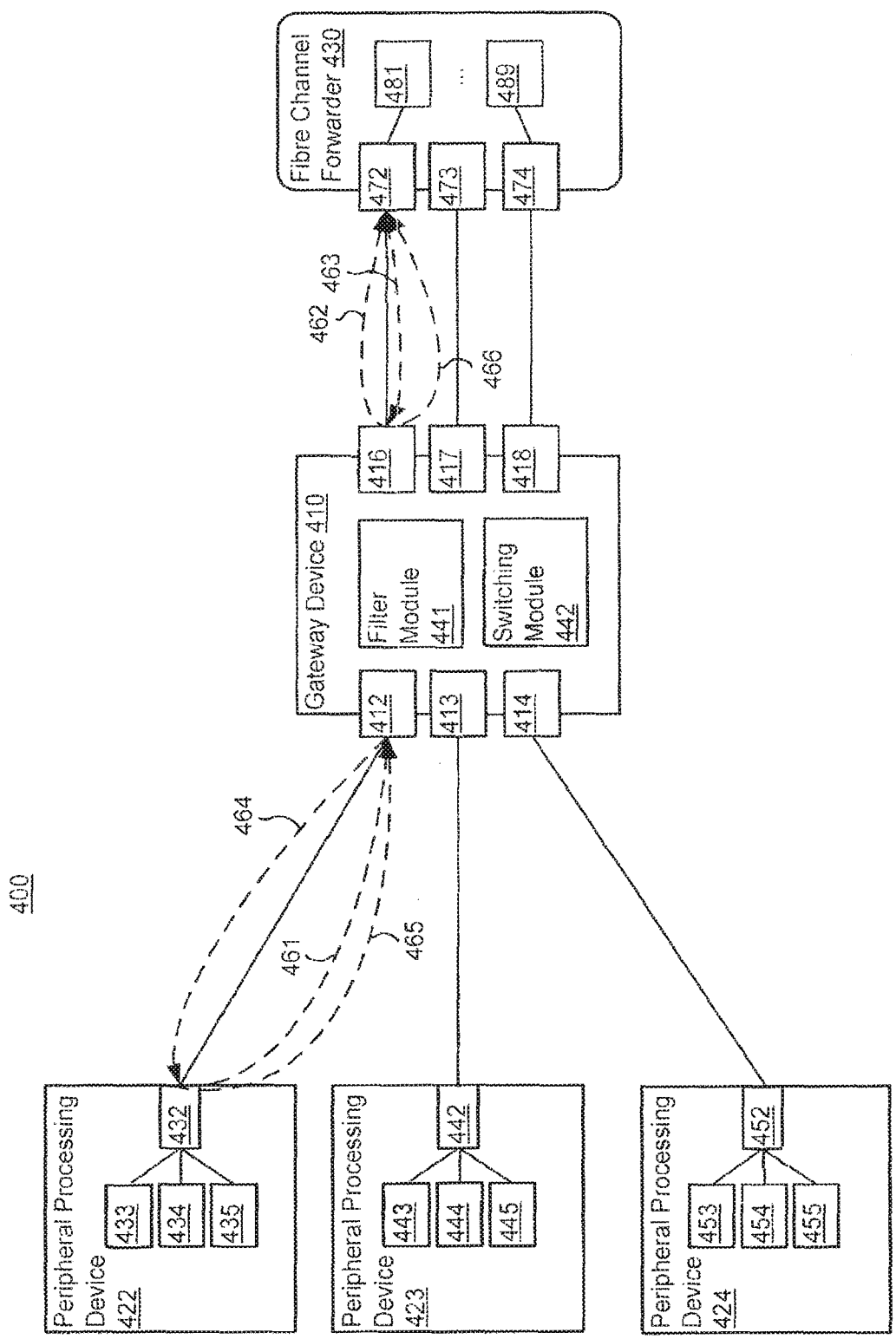
FIG. 4 is a schematic illustration of a mixed Ethernet/Fibre Channel network portion that employs a reduced number of filters for transmitting data from a Fibre Channel switch to one or more peripheral processing devices.

FIG. 4 is a schematic illustration of a mixed Ethernet/Fibre Channel network portion having a reduced number of filters for switching data frames from a Fibre Channel Forwarder to one or more peripheral processing devices, according to an embodiment. More specifically, FIG. 4 illustrates a Network Portion 400 that includes a Gateway Device 410 physically and/or operatively coupled to Peripheral Processing Devices 422-424 (via Ethernet Ports 412-414) and a Fibre Channel Forwarder 430 (via Fibre Channel Ports 416-418). The Fibre Channel Forwarder 430 is operatively and/or physically coupled to the Gateway Device 410 via the Fibre Channel Ports 472-474, and to a Fibre Channel Network 440. The Fibre Channel Forwarder 430 includes a set of Virtual Fibre Channel F Ports 481-489, each of which is operatively and/or figuratively coupled to at least one of the Fibre Channel Ports 472-474. The Peripheral Processing Devices 422-424 are operatively and/or physically coupled to the Gateway Device 410 via the FCoE Ports 432, 442 and 452, respectively, and to the Gateway Device 410. The FCoE Ports 432, 442 and 452 are operatively coupled to the Virtual Fibre Channel N Ports 433-435, 443-445 and 453-455, respectively. Each of the Virtual Fibre Channel N Ports 433-435, 443-445 and 453-455 is operatively coupled to one of the Virtual Fibre Channel F Ports 481-489 instantiated at the Fibre Channel Forwarder 430. In some embodiments, each of the above-described elements shown in FIG. 4 can be substantially similar to the like-named element(s) shown and described in connection with FIG. 1 above.

In some embodiments, any of the FCoE Ports 432, 442 and 452 can receive a Fibre Channel fabric login request from one of the Virtual Fibre Channel N Ports 433-435, 443-445 and 453-455, and accordingly define an FIP request based thereon. The Fibre Channel fabric login can be, for example, a FLOGI (Fabric Login) or FDISC (Fabric Discovery) request, and the FIP request can be FIP FLOGI or FIP FDISC request. The FIP request can configured to request assignment of an FCID and/or MAC address to the Virtual Fibre Channel N Port 433 (i.e., the virtual Fibre Channel N Port from which the Fibre Channel fabric login request originated). The FCoE Port can then send a signal including the FIP request to the Gateway Device 410. For example, as shown in FIG. 4, the FCoE Port 432 of the Peripheral Processing Device 422 can receive a Fibre Channel request from the Virtual Fibre Channel N Port 433, define an FIP request based thereon, and send a Signal 461 including the FIP request to the Gateway Device 410. The Gateway Device 410 can receive the FIP request included in the Signal 461 and, as shown in FIG. 4, send a Signal 462 to the Fibre Channel Forwarder 430. As also shown in FIG. 4, the Gateway Device 410 can send the Signal 462 via the Fibre Channel Port 416, and the Fibre Channel Forwarder 430 can receive the Signal 462 via the Fibre Channel Port 472. The Signal 462 can include the a Fibre Channel fabric login request (i.e., Fibre Channel FLOGI or FDISC request) based on the FIP request originally included in the Signal 461.

Upon receipt of the Fibre Channel fabric login request included in the Signal 462, the Fibre Channel Forwarder 430 can assign a Fibre Channel ID (FCID) to the Virtual Fibre Channel N Port 433. The FCID can include an 8-bit domain ID associated with the Fibre Channel Forwarder 430, an 8-bit area ID associated with the set of virtual Fibre Channel N Ports 433-435 and an 8-bit port ID associated with the Fibre Channel Port 433 of the Peripheral Processing Device 422.

Because each of the Virtual Fibre Channel N Ports 433-435 is instantiated at the same peripheral processing device (i.e., the Peripheral Processing Device 422), each of the Virtual Fibre Channel N Ports 433-435 is associated with the same domain ID and area ID. In some embodiments, each FCID associated with one of the Virtual Fibre Channel N Ports 433-435 can include a port ID that includes an identical portion, such as an identical initial bit, initial two bits, etc. Because as described above each of the Virtual Fibre Channel N Ports 433-435 is associated with the same destination ID (8 bits), area ID (8 bits), and, optionally, a predetermined identical portion of the port ID (1-7 bits), each FCID assigned by the Fibre Channel Forwarder 430 for any of the Virtual Fibre Channel N Ports 433-435 will be identical in at least the initial 16 bits.

Having defined the FCID for the Virtual Fibre Channel N Port 433, the Fibre Channel Forwarder 430 can send a Signal 463 to the Gateway Device 410 via the Fibre Channel Port 472. As shown in FIG. 4, the Gateway Device 410 can receive the Signal 463 via the Fibre Channel Port 416. In some embodiments, the Signal 463 can include the FCID assigned to the Virtual Fibre Channel N Port 433. Upon receipt of the Signal 463 including the FCID for the Virtual Fibre Channel N Port 433, the Gateway Device 410 can define a MAC address for the Virtual Fibre Channel N Port 433. In some embodiments, the MAC address can be 48 bits in length, and can be comprised of various component parts. For example, the MAC address can include, in the first 24 bits, an OUI associated with the Network Portion 400 and/or the Fibre Channel Switch 430. Alternatively, the MAC address can include, in the first 24 bits, a prefix based on a locally-provisioned gateway ID (similar to a domain ID), the gateway ID having been defined by, for example, an administrator of the Network Portion 400. In some embodiments, the prefix can be associated with and/or assigned to each of the Peripheral Processing Devices 122-124. The MAC address can also include, in the second 24 bits, the FCID assigned to the Virtual Fibre Channel N Port 433 by the Fibre Channel Switch 430. As described above, the FCID assigned to the Virtual Fibre Channel N Port 433 includes a common destination ID, a common area ID, and, optionally, a common predetermined port ID portion (1-7 bits) included in all FCIDs assigned to any virtual Fibre Channel N port instantiated at the Peripheral Processing Device 422 (i.e., any of the Virtual Fibre Channel N Ports 433-435). Because each of the Virtual Fibre Channel N Ports 433-435 is associated with the same first 24 bits, destination ID (8 bits), area ID (8 bits), and, optionally, a predetermined identical portion of the port ID (1-7 bits), each MAC address assigned by the Gateway Device 410 to any of the Virtual Fibre Channel N Ports 433-435 will be identical in at least the initial 40 bits. As such, it can be determined for any virtual Fibre Channel N port present within the Network Portion 400 whether that virtual Fibre Channel N port is one of the Virtual Fibre Channel N Ports 433-435 having a MAC address based on the common 40+ bit portion described above. Accordingly, the Gateway Device 410 can next define a MAC address mask associated with the Peripheral Processing Device 422 (and thus each of the Virtual Fibre Channel N Ports 433-435), the MAC address mask including the common component portions described above.

Having defined a MAC address for the Virtual Fibre Channel N Port 433 and a MAC address mask for the Peripheral Processing Device 422, the Gateway Device 410 can next define a filter associated with the Virtual Fibre Channel N Port 433 and the Peripheral Processing Device 422. More specifically, the Filter Module 441 of the Gateway Device 410 can define a filter based at least in part on the MAC address mask. In some embodiments, the filter can stipulate or allow that a Fibre Channel frame included in an FCoE frame that contains a source MAC address including an initial portion that matches the MAC address mask be sent to the Fibre Channel Forwarder 430. Because each MAC address assigned by the Gateway Device 410 for any of the Virtual Fibre Channel N Ports 433-435 will include the same first 24 bits (e.g., an OUI), destination ID, area ID, and predetermined port ID portion (as described above), all FCoE frames sent from the Peripheral Processing Device 422 for delivery to the Fibre Channel Forwarder 430 will include a source MAC address including an initial portion that matches the MAC address mask. Because of this, all such source MAC addresses will satisfy the defined filter, and as such, the Gateway Device 410 can allow all properly-constructed Fibre Channel frames included in FCoE frames sent from one of the Virtual Fibre Channel N Ports 433-435 to be sent on to the Fibre Channel Forwarder 430. In this manner, the Gateway Device 410 can define and employ a single filter rule for switching and/or forwarding/redirecting all FCoE frames received from the Peripheral Processing Device 422.

Having defined the filter as described above, the Gateway Device 410 can send, to the Virtual Fibre Channel N Port 433, an FIP response including both the assigned MAC address and the FCID. More specifically, the Gateway Device 410 can send a Signal 464 via the Ethernet Port 413 and the FCoE Port 432. The Signal 464 can be received at the FCoE Port 432. Upon arrival at the FCoE Port 432, a frame formatter module (not shown in FIG. 4) at the Peripheral Processing Device 422 can receive the FIP response and send, to the Virtual Fibre Channel N Port 433, a Fibre Channel fabric login response including the assigned MAC address and assigned FCID.

Although not explicitly shown in FIG. 4, in some embodiments, each of the Virtual Fibre Channel N Ports 434 and 435 can perform a Fibre Channel login to the Fibre Channel Forwarder 430 via the Gateway Device 410. In this manner, each of the Virtual Fibre Channel N Ports 434 and 435 can receive an FCID assigned by the Fibre Channel Forwarder 430 (based at least in part on the common FCID portion described above) and a MAC address assigned by the Gateway Device 410 (based at least in part on the common MAC address portion described above). Having already defined a filter rule based on the MAC address prefix, in some embodiments the Gateway Device 410 can define no additional filter rules associated with the Virtual Fibre Channel N Ports 434 and 435. In some embodiments, instead of sending a Fibre Channel FLOGI request, each of the Virtual Fibre Channel N Ports 434 and 435 can send a Fibre Channel FDISC request, and accordingly the Peripheral Processing Device can send an FIP FDISC request in lieu of an FIP FLOGI request.

Having assigned the FCID and MAC address, and defined an associated filter rule, the Gateway Device 410 can receive a Signal 465 from the Peripheral Processing Device 424. More specifically, the Peripheral Processing Device 424 can transmit the Signal 465 from the FCoE Port 452 to the Ethernet Port 413 of the Gateway Device 410. The Signal 465 can include, for example, an FCoE frame that includes a source MAC address, an initial portion of which matches the MAC address prefix associated with the filter rule described above. Upon receipt of the FCoE frame, the Switching Module 442 can apply the filter defined above to the received FCoE frame. More specifically, the Switching Module 442 can determine that a portion of the source MAC address included in the FCoE frame matches the defined MAC address mask (described above). Having made this determination, the Gateway Device 410 can determine that the received FCoE frame satisfies the defined filter. Accordingly, the Gateway Device 410 can extract (i.e., decapsulate) the encapsulated Fibre Channel frame from within the received FCoE frame and send the Fibre Channel frame to the Fibre Channel Forwarder 430. More specifically, the Gateway Device 410 can include the Fibre Channel frame in a Signal 466, and, as shown in FIG. 4, send the Signal 466 to the Fibre Channel Forwarder 430 via the Fibre Channel Port 416 and the Fibre Channel Port 472. Upon receipt of the Signal 466, the Fibre Channel Forwarder can send the Fibre Channel frame to an appropriate virtual Fibre Channel F port from the Virtual Fibre Channel F Ports 481-489.

Although not shown in FIG. 4, in some embodiments, each of the Peripheral Processing Devices 422-424 can be operatively coupled to the Gateway Device 410 via a network, such as an Ethernet network. In such embodiments, upon receipt of an FIP response from the Fibre Channel Forwarder 430, the Gateway Device 410 can associate the MAC address mask described above with the FCoE port from which the original and corresponding FIP request was received. In this manner, the Gateway Device 410 can associate each FCoE port with a MAC address mask defined for the peripheral processing device at which the FCoE port is located.

Upon receipt of an FCoE frame from one of the Peripheral Processing Devices 422-424 (via the Ethernet network), the Switching Module 442 can perform a lookup on a table, database and/or file. The lookup can allow the Switching Module 442 to determine whether the source MAC address included in the FCoE frame and/or the MAC address mask described above is associated with the FCoE port from which the received FCoE frame was sent. In this manner, the Switching Module 442 can prevent MAC address "spoofing", wherein an FCoE or other frame includes a source MAC address other than its own, and thereby misrepresents the source of the frame. Although not shown in FIG. 4, in such an embodiment the Switching Module 442 can determine that a MAC address mask matching an initial portion of a source MAC address included in a received FCoE frame is not associated with the FCoE Port from which the received FCoE frame was sent. Thus, the Switching Module 442 can "drop" and/or reject the received FCoE frame, and optionally send a signal to the sending peripheral processing device and FCoE port, the signal including notification of the rejection of the FCoE frame.

Figure 5:
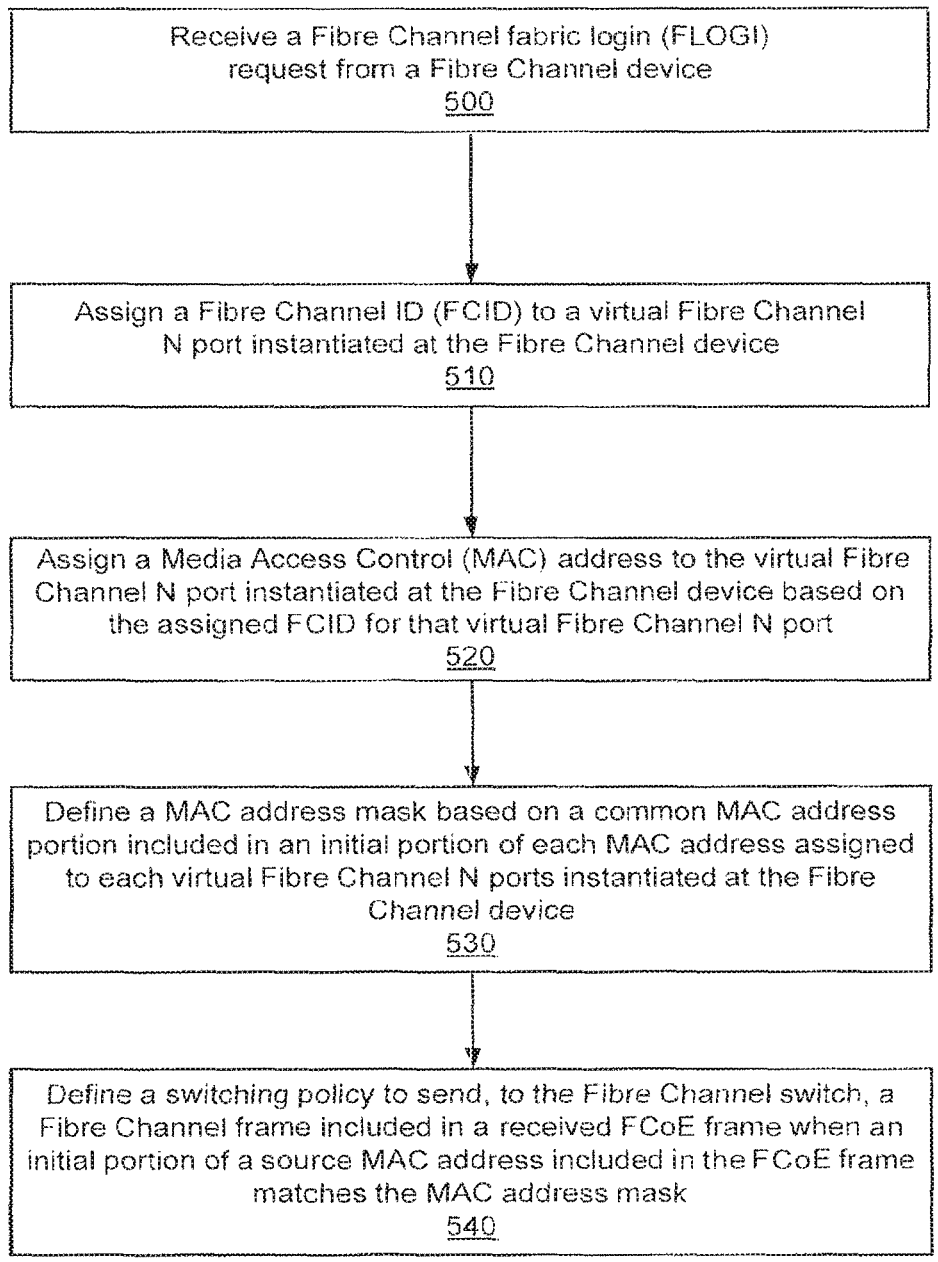
FIG. 5 is a flow chart that illustrates a method of defining a switching policy based at least in part on a MAC address mask, according to another embodiment.

FIG. 5 is a flow chart that illustrates a method of defining a switching policy based at least in part on a MAC address mask, according to another embodiment. In some embodiments, the MAC address mask is based at least in part on a common initial portion included in each of one or more MAC addresses assigned to a set of virtual Fibre Channel N ports instantiated at a network device.

A Fibre Channel switch can receive a Fibre Channel fabric login request from a Fibre Channel device, at 500. In some embodiments, the Fibre Channel switch can be any standard Fibre Channel switch, such as the Fibre Channel Forwarder 300 discussed in connection with FIG. 3 above and/or the Fibre Channel Forwarder 430 discussed in connection with FIG. 4 above. The Fibre Channel device can be a peripheral processing device and/or server. In some embodiments, the Fibre Channel switch can receive the Fibre Channel fabric login request from a peripheral processing device and/or server, the Fibre Channel fabric login request having been included in an FIP request sent via one or more FCoE frames transferred through an Ethernet network and/or a gateway device. The Fibre Channel fabric login request can be, for example, a FLOGI or FDISC request configured to request an FCID and/or a MAC address for a virtual Fibre Channel N port instantiated at the peripheral processing device.

The Fibre Channel switch can assign an FCID to the virtual Fibre Channel N port instantiated at the Fibre Channel device, at 510. The FCID can be defined based at least in part on a domain ID associated with the Fibre Channel switch and an area ID and port ID associated with one or more virtual Fibre Channel N ports of the peripheral processing device. In some embodiments, the FCID can be a 24-bit string including an 8-bit domain ID, followed by an 8-bit area ID, followed by an 8-bit port ID.

The Fibre Channel switch can next assign a MAC address to the virtual Fibre Channel N port instantiated at the Fibre Channel device, at 520. The MAC address can be defined based at least in part on the FCID assigned to that virtual Fibre Channel N port by the Fibre Channel switch. The MAC address can also be defined based at least in part on a 24-bit OUI associated with the Fibre Channel switch, or other common 24-bit prefix (such as a common gateway ID). In some embodiments, the assigned MAC address can be a 48-bit string that includes the common 24-bit prefix in the first 24 bits and the 24-bit FCID in the second set of 24 bits. Alternatively, in some embodiments, the MAC address can be assigned by an FCoE gateway device logically and/or physically located between the peripheral processing device and the Fibre Channel switch.

The Fibre Channel switch and/or an FCoE gateway can define a MAC address mask, at 530. The MAC address mask can be based at least in part on a common MAC address portion included in an initial portion of each MAC address assigned to any virtual Fibre Channel N port instantiated at the requesting peripheral processing device. For example, the MAC address mask can include the common 24-bit prefix discussed above, along with a common FCID portion included in all FCIDs assigned to any virtual Fibre Channel N port instantiated at the requesting peripheral processing device. The common FCID portion can include, for example, a common 8-bit domain ID and a common 8-bit area ID. The common FCID portion can also optionally include a common portion included in each unique 8-bit port ID assigned to any of the virtual Fibre Channel N ports instantiated at the peripheral processing device. In some embodiments, the FCoE gateway can be substantially similar to the Gateway Device 110 discussed in connection with FIG. 1 above. In such embodiments, the FCoE gateway can receive, from the Fibre Channel switch, a signal including a Fibre Channel fabric login response. The Fibre Channel fabric login response can include the assigned MAC address and/or the assigned FCID. In such embodiments, the FCoE gateway can include a filter module configured to define the MAC address mask as described above.

The FCoE gateway can next define a switching policy allowing transmission of a Fibre Channel frame included in a received FCoE frame to the Fibre Channel switch when an initial portion of a source MAC address included in the FCoE frame matches the MAC address mask, at 540. Thus, in such embodiments a single switching policy enables forwarding to the Fibre Channel switch of any FCoE frame with a source MAC address including an initial portion that matches the MAC address mask. In this manner, the single switching policy serves to ensure correct switching of all FCoE frames sent from any virtual Fibre Channel N port instantiated at the peripheral processing device. Additionally, the single switching policy can be used by the FCoE gateway to block and/or drop any received FCoE frames that do not include a source MAC address a portion of which matches a predefined MAC address mask, thereby preventing the entry of any untrusted data into the Fibre Channel switch and/or network. In some embodiments, the Fibre Channel switch and/or the FCoE gateway can define the switching policy using a switching policy or filter module (e.g., a filter module similar to the Filter Module 441 discussed in connection with FIG. 4 above).

Figure 6:
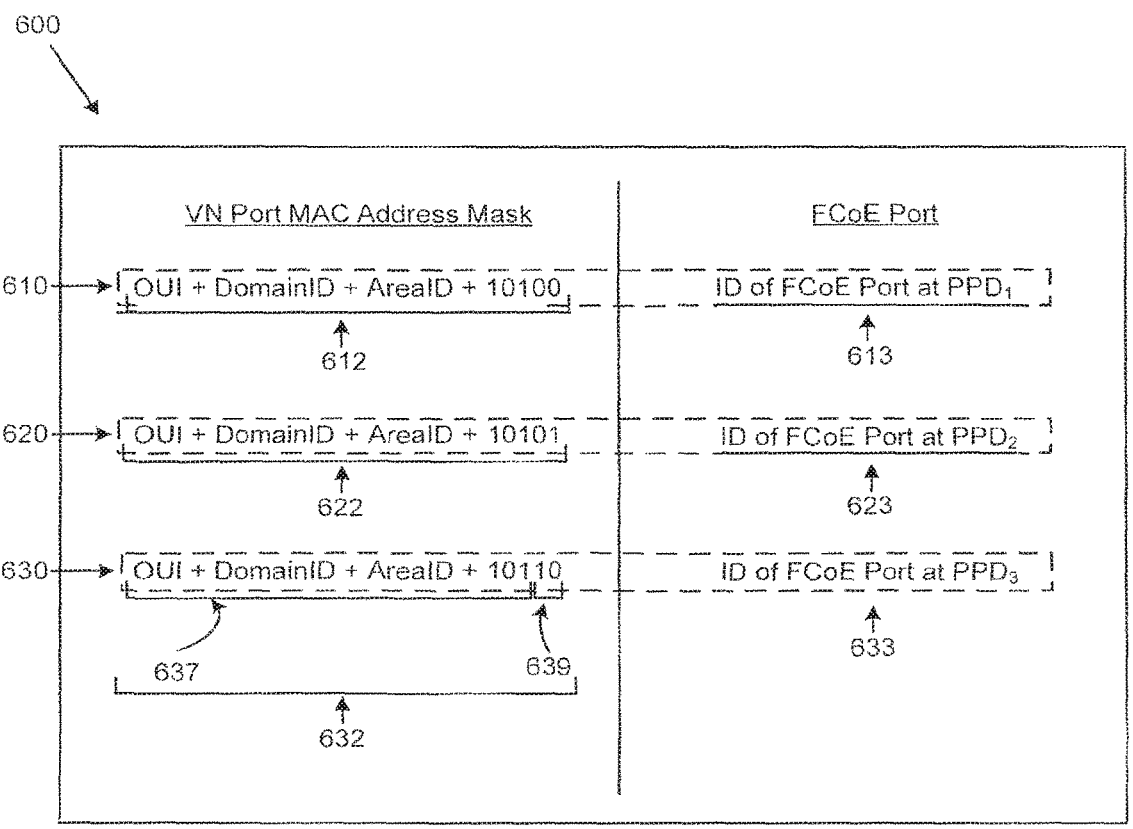
FIG. 6 is a diagram that illustrates a switching table including multiple filters based on MAC address masks, according to another embodiment.

FIG. 6 is a diagram that illustrates a table including multiple MAC address mask/FCoE port pairs, according to another embodiment. More specifically, FIG. 6 illustrates a Table 600 that includes MAC Address Mask/FCoE Port Pairs 610, 620 and 630. The MAC Address Mask/FCoE Port Pairs 610, 620 and 630 each include a unique MAC Address Mask 612, 622 and 632, respectively, and an FCoE Port ID 613, 623 and 633 (of the peripheral processing devices PPD$_1$, PPD$_2$ and PPD$_3$), respectively. Each of the MAC Address Masks 612, 622 and 632 included in the MAC Address Mask/FCoE Port Pairs 610, 620 and 630 includes a Common MAC Address Mask Portion 637. The Common MAC Address Mask Portion 637 can be a MAC address portion common to all MAC addresses assigned to all virtual ports instantiated at any of the Peripheral Processing Devices PPD$_1$, PPD$_2$ and PPD$_3$. Each of the MAC Address Masks 612, 622 and 632 can be a MAC address portion longer than the Common MAC Address Mask Portion 637 and common to all MAC addresses assigned to all virtual ports instantiated at the Peripheral Processing Device PPD$_1$, PPD$_2$ and PPD$_3$, respectively.

As shown in FIG. 6, the Common MAC Address Mask Portion 637 can include a common OUI associated with a switch fabric or portion of a switch fabric system, a common domain ID associated with a network switch of the switch fabric system, a common area ID associated with a set of virtual Fibre Channel N ports of a peripheral processing device, and a common port ID portion. Although not shown in FIG. 6, in some embodiments, the Common MAC Address Mask Portion 637 can alternatively include another common first 24-bit portion, such as a 24-bit gateway ID. The common port ID portion can be a common port ID prefix included in all port IDs associated with the network switch and/or instantiated at a given peripheral processing device. As also shown in FIG. 6, the MAC Address Mask 632 includes a Two-bit End Portion 639 that is distinct from the final two bits of the MAC Address Masks 612 and 622. The MAC Address Mask/FCoE Port Pair 610 includes the MAC Address Mask 612, which ends with the two-bit sequence 00 and the FCoE Port ID for the PPD$_1$, 613. The MAC Address Mask/FCoE Port Pair 620 includes the MAC Address Mask 622, which ends with the two-bit sequence 01 and FCoE Port ID for the PPD$_2$, 623. The MAC Address Mask/FCoE Port Pair 630 includes the MAC Address Mask 632, which ends with the two-bit sequence 10 and the FCoE Port ID for the PPD$_3$, 633. In some embodiments, the Two-bit End Portion 639 can alternatively be a one-bit, three-bit, four-bit, five-bit, six-bit, or seven-bit end portion. The Two-bit End Portion 639 can have a length in bits sufficient to distinguish each of the MAC Address Masks 612, 622 and 632 from all other MAC address masks included in the Table 600.

In some embodiments, the Table 600 can be included in and/or referenced by a gateway device and/or a network switch, such as the Gateway Device 110 and/or the Fibre Channel Forwarder 130, respectively, discussed in connection with FIG. 1 above. In such embodiments, the Table 600 can be used by the gateway device and/or the network switch to determine whether a source MAC address included in a received FCoE frame is associated with the FCoE port from which the FCoE frame was sent. For example, a gateway device can receive an FCoE frame from, for example, a peripheral processing device (such as one of the PPD$_1$, the PPD$_2$ and the PPD$_3$). The gateway device can then determine whether the source MAC address included in the received FCoE frame matches a MAC address mask from the MAC Address Masks 612, 622 and 632. If so, the gateway device can determine, based on the Table 600, whether the matching MAC address mask is associated with the FCoE port from which the FCoE frame was received. If the gateway device determines that the FCoE port associated with the matching MAC address mask in the Table 600 is the same FCoE port from which the FCoE frame was sent, the gateway device can decapsulate a Fibre Channel frame included in the FCoE frame and send the Fibre Channel frame to a Fibre Channel switch or forwarder. If, however, the gateway device determines that the FCoE port associated with the matching MAC address mask in the Table 600 is not the same FCoE port from which the FCoE frame was sent, the gateway device can determine that the received FCoE frame includes a "spoofed" (i.e., misrepresented) source MAC address, and can drop and/or reject the FCoE frame, not forwarding the Fibre Channel frame encapsulated therein on to the Fibre Channel switch or forwarder.

Some embodiments described herein relate to a computer storage product with a non-transitory computer-readable medium (also can be referred to as a non-transitory processor-readable medium) having instructions or computer code thereon for performing various computer-implemented operations. The computer-readable medium (or processor-readable medium) is non-transitory in the sense that it does not include transitory propagating signals per se (e.g., a propagating electromagnetic wave carrying information on a transmission medium such as space or a cable). The media and computer code (also can be referred to as code) may be those designed and constructed for the specific purpose or purposes. Examples of non-transitory computer-readable media include, but are not limited to: magnetic storage media such as hard disks, floppy disks, and magnetic tape; optical storage media such as Compact Disc/Digital Video Discs (CD/DVDs), Compact Disc-Read Only Memories (CD-ROMs), and holographic devices; magneto-optical storage media such as optical disks; carrier wave signal processing modules; and hardware devices that are specially configured to store and execute program code, such as Application-Specific Integrated Circuits (ASICs), Programmable Logic Devices (PLDs), Read-Only Memory (ROM) and Random-Access Memory (RAM) devices.

Examples of computer code include, but are not limited to, micro-code or micro-instructions, machine instructions, such as produced by a compiler, code used to produce a web service, and files containing higher-level instructions that are executed by a computer using an interpreter. For example, embodiments may be implemented using Java, C++, or other programming languages (e.g., object-oriented programming languages) and development tools. Additional examples of computer code include, but are not limited to, control signals, encrypted code, and compressed code.

While various embodiments have been described above, it should be understood that they have been presented by way of example only, not limitation, and various changes in form and details may be made. Any portion of the apparatus and/or methods described herein may be combined in any combination, except mutually exclusive combinations. The embodiments described herein can include various combinations and/or sub-combinations of the functions, components and/or features of the different embodiments described. For example, in some embodiments an access switch and a peripheral processing device in a switch fabric can be included in a single hardware device or module.

What is claimed is:

1. An apparatus, comprising:
    a gateway device having a processor and a memory operatively coupled to the processor, the processor configured to define a first plurality of Fibre Channel IDs (FCIDs) and a first plurality of Media Access Control (MAC) addresses, each FCID from the first plurality of FCIDs and each MAC address from the first plurality of MAC addresses uniquely associated with a virtual N-port from a first plurality of virtual N-ports instantiated at a network device, each MAC address from the plurality of MAC addresses being defined based at least in part on (1) a gateway ID associated with the apparatus and (2) a FCID from the first plurality of FCIDs uniquely associated with that MAC address;
    the processor configured to define a first filter to be applied to a first data frame sent from any virtual N-port from the first plurality of virtual N-ports, the first filter being based at least in part on a first common MAC address portion included in each MAC address from the first plurality of MAC addresses and having the same value for each MAC address from the first plurality of MAC addresses;
    the processor configured to be operatively coupled to the network device, the processor configured to send the first data frame to a network switch based at least in part on the first filter;
    the processor is further configured to define a second plurality of FCIDs and a second plurality of MAC addresses, each FCID from the second plurality of FCIDs and each MAC address from the second plurality of MAC addresses uniquely associated with a virtual N-port from a second plurality of virtual N-ports instantiated at the network device, each MAC address from the second plurality of MAC addresses being defined based at least in part on (1) an organizationally unique identifier (OUI) associated with the apparatus and (2) a FCID from the second plurality of FCIDs uniquely associated with that MAC address,
    the processor is further configured to define a second filter to be applied to a second data frame sent from any virtual N-port from the second plurality of virtual N-ports, the second filter being based at least in part on a second common MAC address portion included in each MAC address from the second plurality of MAC addresses and having the same value for each MAC address from the second plurality of MAC addresses, the second common MAC address portion being different from the first common MAC address portion, and
    the processor configured to send the second data frame to the network switch based at least in part on the second filter.

2. The apparatus of claim 1, wherein the first common MAC address portion has a length of fewer than 48 bits.

3. The apparatus of claim 1, wherein the first common MAC address portion is based at least in part on a common FCID portion included in each FCID from the first plurality of FCIDs and having the same value for each FCID from the first plurality of FCIDs, the common FCID portion having a length of less than 24 bits, the length being based at least in part on a total number of virtual N-ports instantiated at the network device.

4. The apparatus of claim 1, wherein the first filter allows transmission of the first data frame to the network switch when a portion of a source address included in the first data frame matches at least a portion of the first common MAC address portion.

5. The apparatus of claim 1, wherein the first common MAC address portion includes a common FCID portion included in each FCID from the first plurality of FCIDs.

6. The apparatus of claim 1, wherein the first data frame includes a first FCID from the first plurality of FCIDs uniquely associated with a virtual N-port from the first plurality of virtual N-ports, and
    the processor is configured to send the first data frame to the network switch such that the network switch sends the first data frame to a virtual F-port based at least in part on the first FCID.

7. An apparatus, comprising:
    a memory; and
    a processor operatively coupled to the memory, the processor configured to detect one or more Fibre Channel over Ethernet (FCoE) frames transmitted between a network device and an FCoE switch included within a switch fabric portion, the processor configured to receive a Fibre Channel fabric login frame from the FCoE switch;
    the processor configured to define a switching policy to be applied to a data frame sent between any virtual N-port from a plurality of virtual N-ports instantiated at the network device and the FCoE switch, the switching policy being based at least in part on a Media Access Control (MAC) address prefix included in the Fibre Channel fabric login frame, the MAC address prefix being based at least in part on a common MAC address portion included in each MAC address from a plurality of MAC addresses associated with a common area identifier associated with the plurality of virtual N-ports, the common MAC address portion having the same value for each MAC address from the plurality of MAC addresses, the common MAC address portion including (1) a common organizationally unique identifier (OUI) associated with the switch fabric portion, (2) a common identifier associated the FCoE switch and mutually exclusive from the common OUI and the common area identifier, and (3) a common area identifier associated with the plurality of virtual N-ports at the network device; and the processor configured to be operatively coupled to the network device and the FCoE switch, the processor configured to send the data frame to the FCoE switch based at least in part on applying the common MAC address portion to the data frame.

8. The apparatus of claim 7, wherein the Fibre Channel fabric login frame is a Fabric Login (FLOGI) frame.

9. The apparatus of claim 7, wherein the common MAC address portion is based at least in part on a common Fibre Channel ID (FCID) portion included in each FCID from a plurality of FCIDs corresponding to the plurality of virtual N-ports.

10. The apparatus of claim 7, wherein the switching policy prescribes transmission of the data frame to the FCoE switch when a portion of a source address included in the data frame matches at least a portion of the MAC address prefix.

11. The apparatus of claim 7, wherein the processor is further configured to delete the switching policy in response to a logout of a final virtual N-port from the plurality of virtual N-ports.

12. The apparatus of claim 7, wherein the common MAC address portion is based at least on a common Fibre Channel ID (FCID) portion included in each FCID from a plurality of FCIDs corresponding to the plurality of virtual N-ports, the common FCID portion including at least one of a common domain identifier and a common area identifier.

13. The apparatus of claim 7, wherein the common MAC address portion is based at least on a common Fibre Channel ID (FCID) portion included in each FCID from a plurality of FCIDs corresponding to the plurality of virtual N-ports, the common FCID portion including a common port identifier.

* * * * *